US009873211B2

(12) United States Patent
Fridley

(10) Patent No.: US 9,873,211 B2
(45) Date of Patent: Jan. 23, 2018

(54) SYSTEMS AND METHODS FOR SELF-ALIGNING CUTTING HUB ASSEMBLY

(71) Applicant: Gala Industries, Inc., Eagle Rock, VA (US)

(72) Inventor: Michael A. Fridley, Troutville, VA (US)

(73) Assignee: GALA INDUSTRIES, INC., Eagle Rock, VA (US)

( * ) Notice: Subject to any disclaimer, the term of this patent is extended or adjusted under 35 U.S.C. 154(b) by 378 days.

(21) Appl. No.: 14/462,604

(22) Filed: Aug. 19, 2014

(65) Prior Publication Data
US 2015/0056322 A1 Feb. 26, 2015

Related U.S. Application Data

(60) Provisional application No. 61/867,901, filed on Aug. 20, 2013.

(51) Int. Cl.
*B29B 9/06* (2006.01)
*B29C 47/00* (2006.01)
(Continued)

(52) U.S. Cl.
CPC ............... *B29B 9/065* (2013.01); *B26D 5/02* (2013.01); *B26D 7/26* (2013.01); *B29C 47/0066* (2013.01);
(Continued)

(58) Field of Classification Search
CPC ......... B29L 39/06; B29L 39/065; B26D 1/28; B26D 7/2628; B26D 7/2635;
(Continued)

(56) References Cited

U.S. PATENT DOCUMENTS 3,196,487 A * 7/1965 Snelling .................. B29B 9/065
241/95
3,199,311 A * 8/1965 Hill ....................... B21B 35/143
184/6
(Continued)

FOREIGN PATENT DOCUMENTS

JP 2004-330549 A 11/2004

OTHER PUBLICATIONS

International Preliminary Report on Patentability for related PCT Application No. PCT/US2014/051578, Mar. 3, 2016, 9 pages.
(Continued)

*Primary Examiner* — Seyed Masoud Malekzadeh
(74) *Attorney, Agent, or Firm* — Troutman Sanders LLP; Ryan A. Schneider; John A. Morrissett

(57) ABSTRACT

A system that enables a cutter head to pivot for improved alignment with a cutting face or die is disclosed. The system includes a cutter hub and a driveshaft hub mated with a plurality of round, spherical, or ovoid surfaces to enable the cutter hub to pivot with respect to the driveshaft hub. The system can include a plurality of alignment pins with spherical surfaces to transfer torque from the driveshaft hub to the cutter hub. The system can also include a cutter head, which can include a plurality of cutting blades. The system can be used in cutting machinery, such as a pelletizer, where alignment of the cutting head and the cutting die (or other cutting surface) is desirable.

21 Claims, 9 Drawing Sheets

(51) Int. Cl.
- *B29C 47/08* (2006.01)
- *B29C 47/30* (2006.01)
- *B26D 5/02* (2006.01)
- *B26D 7/26* (2006.01)
- *B26D 1/26* (2006.01)
- *B26D 1/28* (2006.01)
- *B26D 1/30* (2006.01)

(52) U.S. Cl.
CPC ......... *B29C 47/0852* (2013.01); *B29C 47/30* (2013.01); *B26D 1/26* (2013.01); *B26D 1/28* (2013.01); *B26D 1/30* (2013.01); *B26D 7/2614* (2013.01); *B26D 7/2621* (2013.01); *B26D 7/2628* (2013.01); *B26D 7/2635* (2013.01); *B29B 9/06* (2013.01); *B29C 47/0011* (2013.01); *B29C 47/0014* (2013.01); *B29C 2793/009* (2013.01); *B29K 2827/18* (2013.01)

(58) Field of Classification Search
CPC ...... B26D 7/2614; B26D 7/2621; B26D 1/26; B26D 1/30; B29C 47/0066; B29C 47/0011; B29C 47/0014
USPC ....... 425/188, 192 R, 311, 313, 202; 83/666, 83/698.41
See application file for complete search history.

(56) References Cited

U.S. PATENT DOCUMENTS

| | | | |
|---|---|---|---|
| 3,271,821 A * | 9/1966 | Street | B29B 9/065 425/313 |
| 4,123,207 A | 10/1978 | Dudley et al. | |
| 4,251,198 A | 2/1981 | Altenburg | |
| 4,500,271 A | 2/1985 | Smith | |
| 4,614,307 A * | 9/1986 | Lauser | B29B 9/065 241/101.4 |
| 4,621,996 A | 11/1986 | Hundley, III | |
| 5,059,103 A * | 10/1991 | Bruckmann | B26D 1/29 264/142 |
| 5,110,523 A * | 5/1992 | Guggiari | B29B 9/065 264/142 |
| 5,403,176 A | 4/1995 | Bruckmann et al. | |
| 5,624,688 A * | 4/1997 | Adams | B29B 9/065 425/196 |
| 6,332,765 B1 | 12/2001 | Spelleken | |
| 6,551,087 B1 * | 4/2003 | Martin | B29B 9/065 425/311 |
| 6,793,473 B1 | 9/2004 | Fridley | |
| 6,824,371 B2 | 11/2004 | Smit | |
| 6,925,741 B2 | 8/2005 | Eloo et al. | |
| 6,939,235 B2 * | 9/2005 | Bruckmann | F16D 3/185 464/159 |
| 7,033,152 B2 * | 4/2006 | Eloo | B29B 9/065 425/308 |
| 7,172,397 B2 | 2/2007 | Fridley | |
| 7,267,540 B2 | 9/2007 | Fridley et al. | |
| 7,296,985 B2 * | 11/2007 | Koehler | B29B 9/065 264/142 |
| 7,318,719 B2 | 1/2008 | Fridley | |
| 7,338,273 B2 * | 3/2008 | Konno | B26D 1/28 425/313 |
| 7,402,034 B2 | 7/2008 | Fridley | |
| 7,524,179 B2 | 4/2009 | Fridley | |
| 8,083,509 B2 * | 12/2011 | Holmes | B29B 9/065 425/313 |
| 8,851,410 B2 * | 10/2014 | Dahlheimer | B29B 9/06 241/277 |
| 8,961,164 B2 * | 2/2015 | Dahlheimer | B29B 9/06 264/142 |
| 2002/0176905 A1 * | 11/2002 | Fridley | B29B 9/065 425/67 |
| 2003/0178231 A1 * | 9/2003 | Bruckmann | F16D 3/185 175/320 |
| 2003/0213352 A1 * | 11/2003 | Konno | B26D 1/28 83/698.41 |
| 2004/0009254 A1 * | 1/2004 | Eloo | B29B 9/065 425/311 |
| 2004/0081716 A1 * | 4/2004 | Eloo | B29B 9/065 425/67 |
| 2004/0241269 A1 | 12/2004 | Meurb | |
| 2007/0003655 A1 * | 1/2007 | Brandstaetter | B29B 9/065 425/313 |
| 2007/0259067 A1 | 11/2007 | Pinchot | |
| 2009/0169665 A1 | 7/2009 | Makida et al. | |
| 2010/0323047 A1 * | 12/2010 | Fridley | B29B 9/065 425/67 |
| 2010/0330216 A1 * | 12/2010 | Hurt | B29C 47/92 425/67 |
| 2013/0037641 A1 * | 2/2013 | Dahlheimer | B29B 9/06 241/277 |
| 2014/0284833 A1 * | 9/2014 | Hurt | B29C 47/92 264/40.1 |

OTHER PUBLICATIONS

International Search Report for related PCT Application No. PCT/US2014/051578, Jan. 22, 2015, 4 pages.

\* cited by examiner

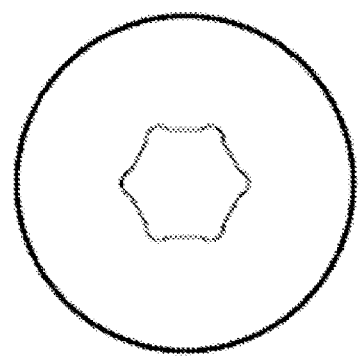
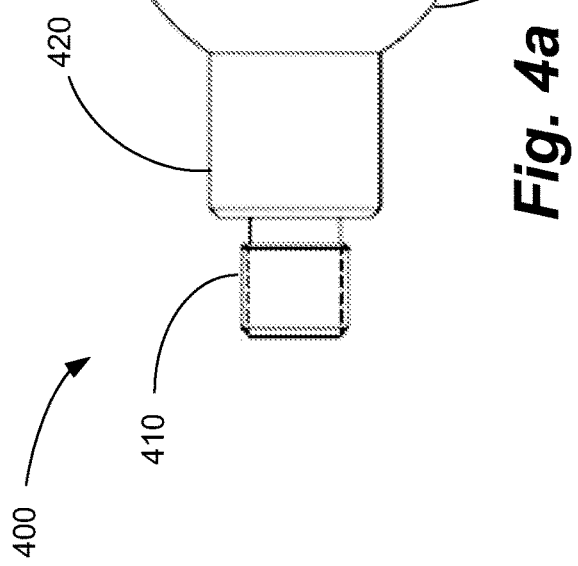
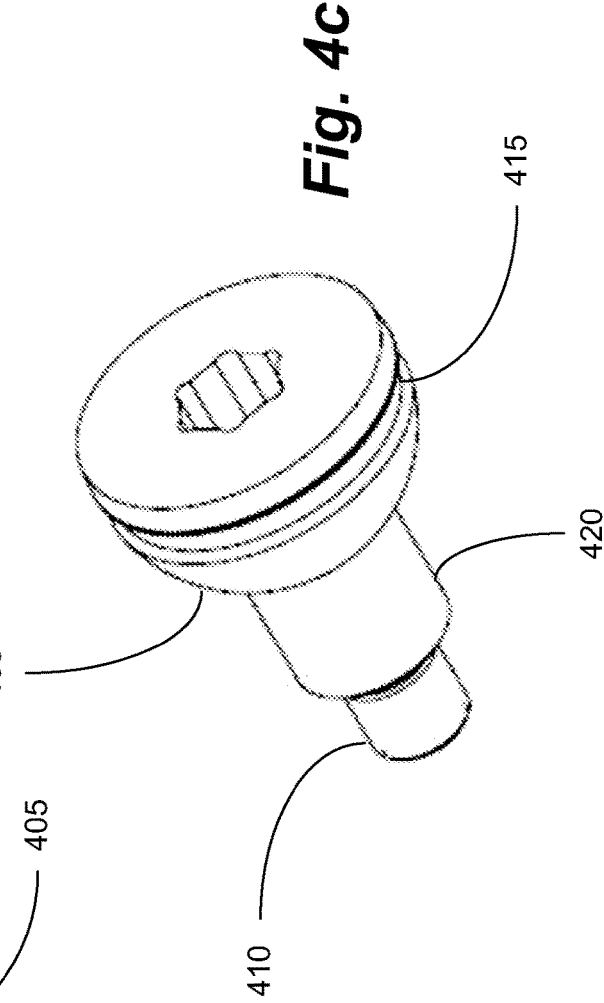

ial application. The entire contents and substance of which is hereby incorporated by reference as if fully set forth below.

SYSTEMS AND METHODS FOR SELF-ALIGNING CUTTING HUB ASSEMBLY

CROSS-REFERENCE TO RELATED APPLICATION

This application claims priority under 35 U.S.C. § 119(e) to U.S. Provisional Patent Application Ser. No. 61/867,901, filed 20 Aug. 2013, and entitled Device for Self-Aligning of Cutting Hub Assembly, the entire contents and substance of which is hereby incorporated by reference as if fully set forth below.

BACKGROUND OF THE INVENTION

1. Field of the Invention

Embodiments of the present invention relate to a self-aligning cutter hub, and specifically to a self-aligning cutter hub assembly for use in a pelletizer such that the blades thereon are in proper alignment with the die face of the extrusion die plate of the pelletizer.

2. Description of the Prior Art

Underwater pelletizers for forming pellets typically use an extrusion die with orifices through which molten polymer is extruded. Specifically, the molten polymer is extruded out from a die face, wherein cutter blades mounted on a rotatable cutter hub cut the plastic "ribbons" into pellets. The cutter hub is generally driven by a drive shaft. The cutter blades (and thus the hub) are preferably aligned such that the blades themselves are substantially parallel to the die face. In this manner, the pellets are substantially uniform in shape, i.e., the pellets from a first side of the die face are not larger than pellets from a second side of the die face due to a misalignment.

As a result, it is desirable to maintain the cutter blades and die face in properly aligned relation so that the cutting edge of the blades on the rotating cutter hub move in very close parallel relation to the die face. This close parallel relationship enables the blades to efficiently cut the extruded plastic into pellets as the plastic strands are discharged from the orifices in the extrusion die plate. As mentioned above, parallel alignment also enables the production of substantially uniform pellets. Additionally, proper alignment prevents unnecessary wear of the cutter blade and/or die plate face due to interference between the two and unnecessary side loading on bearings and shafts.

It is also desirable to be able to separate the cutter head from the die plate to enable, for example and not limitation, cleaning and maintenance, blade replacement, and inspection. Upon reassembly, however, the cutter head must be realigned with the die face. Conventional configurations have often relied on manual alignment of the cutter with the die face. Unfortunately, manually realigning the cutter head every time the machine is serviced requires a skilled worker, a substantial amount of time, and requires expensive and complicated adjustment means.

What is needed, therefore, is a system and method that provides accurate alignment of the cutter head and die plate that is simple and robust. The system should provide good serviceability and performance with relatively low equipment and maintenance costs. It is to such a system that embodiments of the present invention are primarily directed.

BRIEF SUMMARY OF THE INVENTION

Embodiments of the present invention can comprise a cutter hub assembly for a pelletizer, or other industrial machinery. The system can provide, accurately and simply, alignment of a cutter hub and die plate. The system can be used on, for example and not limitation, underwater, water ring, and dry face type pelletizers. The cutter hub assembly can have a self-aligning driving connection between the cutter hub and drive shaft for the hub in which the cutter hub is capable of universal pivotal movement as well as a driving connection between the drive shaft and cutter hub.

The self-aligning hub assembly can comprise a shaft adapter mounted on the end of a drive shaft, with a concave spherical surface. The self-aligning hub assembly can also comprise a plurality of pins that have an elongated spheroid, or rounded, surface for transmitting torque. The system can also comprise a cutting hub adaptor having a convex, spherical surface configured to mate with the concave spherical surface of the shaft adaptor, and recesses for the elongated spheroid shaped pins to transmit the torque for rotation of the hub. The cutting hub adaptor can further include a concave spherical surface on the opposite side of the shaft adapter for slideable engagement with a spherical retaining plug. The convex spherical surface of the spherical retaining plug can be sized and shaped to slideably engage with the concave spherical surface of the cutting hub adaptor. The spherical retaining plug can be held into the assembly by a fastener such as a socket head cap screw or integrated machined treads.

Embodiments of the present invention can comprise a system comprising a driveshaft adapter with a first side and a second side. The driveshaft adapter can comprise a first plurality of alignment holes disposed on the first side and a concave surface disposed on the first side. The driveshaft adapter can further comprise a cutter adapter with a first side and a second side and can comprise a second plurality of alignment holes disposed on the second side and a convex surface disposed on the second side. In some embodiments, the present invention can further comprise a plurality of alignment pins, each with a first end and a second end, and each of the first ends comprising a rounded surface sized and shaped to be in slideable engagement with one or more of the first and second plurality of alignment holes. In some embodiments, the cutter adapter can pivot on the convex surface, concave surface, and the rounded surfaces on the plurality of alignment pins to align the cutter adapter with a die face.

In some embodiments, a concave surface can be disposed on the first side of the cutter adapter. In some embodiments, a plug adapter comprising a convex surface sized and shaped to be in slideable engagement with the concave surface on the first side of the cutter adapter can be configured to be in engagement with the driveshaft adapter.

In some embodiments, one or more of the concave surface of the driveshaft adapter, the convex surface of the cutter adapter, the concave surface of the cutter adapter, and the convex surface of the plug adapter can be surface treated by one or more of polishing, electro-less plating, electroplating, plasma coating, PTFE coating, composite diamond coating, or PVD coating. In some embodiments, the plug adapter can further comprise a first seal groove disposed on the convex surface and an adapter seal sealing the convex surface of the plug adapter and the concave surface on the first side of the cutter adapter. In some embodiments, the adapter seal can be an o-ring.

In some embodiments, the cutter adapter can further comprise a first threaded surface disposed on an external perimeter of the cutter adapter, and there can be a toroidal cutter head comprising a plurality of cutting blades disposed on an external perimeter surface and a second threaded surface disposed on an internal perimeter surface that can be threadably engageable with the first threaded surface disposed on the external perimeter of the cutter adapter. In some embodiments, each of the plurality of cutting blades can further comprise one or more mounting fasteners detachably coupling the plurality of cutting blades to the toroidal cutter head.

In some embodiments, the present invention can further comprise a first groove disposed on the first side of the driveshaft adapter, a second groove disposed on the second side of the cutter adapter, and a first seal for sealing the first surface of the driveshaft adapter to the second surface of the cutter adapter. In some embodiments, the second end of each of the plurality of alignment pins comprises threads for threadable engagement with one of the driveshaft adapter and the cutter adapter.

In some embodiments, a cutter head can be attached to the cutter adapter and a force applied to the cutter head can cause the cutter adapter to pivot. In some embodiments, the rounded surface on the plurality of alignment pins comprises one or more of a surface hardness treatment and a surface lubricity treatment.

Embodiments of the present invention can further comprise a system comprising a power source, a driveshaft with a first end and a second end, the first end detachably coupled to the power source, and a driveshaft adapter with a first side and a second side, the first side detachably coupled to the second end of the driveshaft. In some embodiments, the driveshaft adapter can comprise a first plurality of alignment holes disposed on the second side and a concave surface disposed on the second side. In some embodiments, the invention can further comprise a cutter adapter with a first side and a second side. The cutter adapter can comprise a second plurality of alignment holes disposed on the first side and a convex surface disposed on the first side. In some embodiments the invention can further comprise a plurality of alignment pins, each with a first end and a second end, each of the first ends comprising a rounded surface in slideable engagement with one or more of the first and second plurality of alignment holes. In some embodiments, the cutter adapter can pivot on the convex surface, concave surface, and rounded surfaces on the plurality of alignment pins.

In some embodiments, the invention can further comprise a die face comprising a plurality of extrusion holes, a cutter head attached to the cutter adapter and comprising cutting blades, and the cutter adapter can pivot to align the cutting blades with the die face in parallel arrangement. In some embodiments, the cutting blades can contact the die face and the resulting force can cause the cutter adapter to pivot.

In some embodiments, the cutter adapter can further comprise a first threaded surface disposed on an external perimeter of the cutter adapter, a toroidal cutter head comprising a plurality of cutting blades disposed on an external perimeter surface and a second threaded surface disposed on an internal perimeter surface and threadably engageable with the first threaded surface disposed on the external perimeter of the cutter adapter, and the cutter adapter can pivot to align the plurality of cutting blades with the die face in parallel arrangement.

In some embodiments, the driveshaft adapter and the plurality of alignment pins are integrally manufactured. In some embodiments, the rounded surface on the plurality of alignment pins comprises a surface hardness treatment. In some embodiments, the rounded surface on the plurality of alignment pins comprises a surface lubricity treatment. In some embodiments, one or more of the concave surface of the driveshaft adapter and the convex surface of the cutter adapter are surface treated by one or more of polishing, electro-less plating, electroplating, plasma coating, PTFE (polytetrafluoroethylene) coating, composite diamond coating, or PVD (physical vapor deposition) coating.

Embodiments of the present invention can further comprise a system for aligning cutting blades with a die surface. The system can comprise a driveshaft adapter connected to a driveshaft and having a concave surface disposed on a first side, a cutter adapter, a plug adapter with a convex surface disposed on a first side, and a cutter head attached to the cutter adapter and comprising cutting blades. In some embodiments, the cutter adapter can pivot between the concave surface of the driveshaft adapter and the convex surface of the plug adapter in response to a force applied to the cutting blades.

In some embodiments, the cutter adapter can comprise a convex surface in slideable engagement with the concave surface of the driveshaft adapter and a concave surface in slideable engagement with the convex surface of the plug adapter. In some embodiments, the invention can further comprise a plurality of alignment pins to transfer torque from the driveshaft adapter to the cutter adapter, and the alignment pins do not prevent the cutter adapter from pivoting. In some embodiments, the alignment pins can comprise a rounded surface with one or more of a surface hardness treatment and a surface lubricity treatment.

In some embodiments, one or more of the concave surface of the driveshaft adapter and the convex surface of the plug adapter can be surface treated by one or more of polishing, electro-less plating, electroplating, plasma coating, PTFE coating, composite diamond coating, or PVD coating.

These and other objects, features and advantages of the present invention will become more apparent upon reading the following specification in conjunction with the accompanying drawing figures.

BRIEF DESCRIPTION OF THE DRAWINGS

FIGS. 4a-4c illustrate a schematic view, a top view, and an isometric view, respectively, of a hemispherical retainer plug, in accordance with some embodiments of the present invention.

DETAILED DESCRIPTION OF THE INVENTION

Figure 1A:
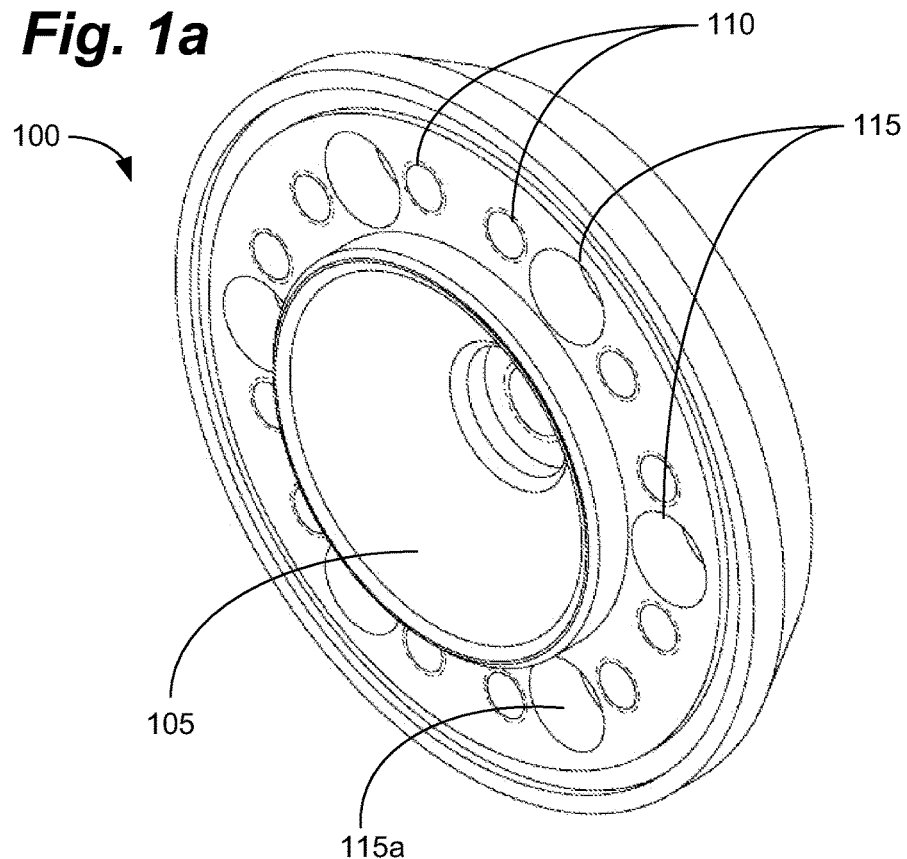
FIGS. 1a and 1b illustrate an isometric view of the front and rear side, respectively, of a driveshaft adapter, in accordance with some embodiments of the present invention.
Figure 1B:
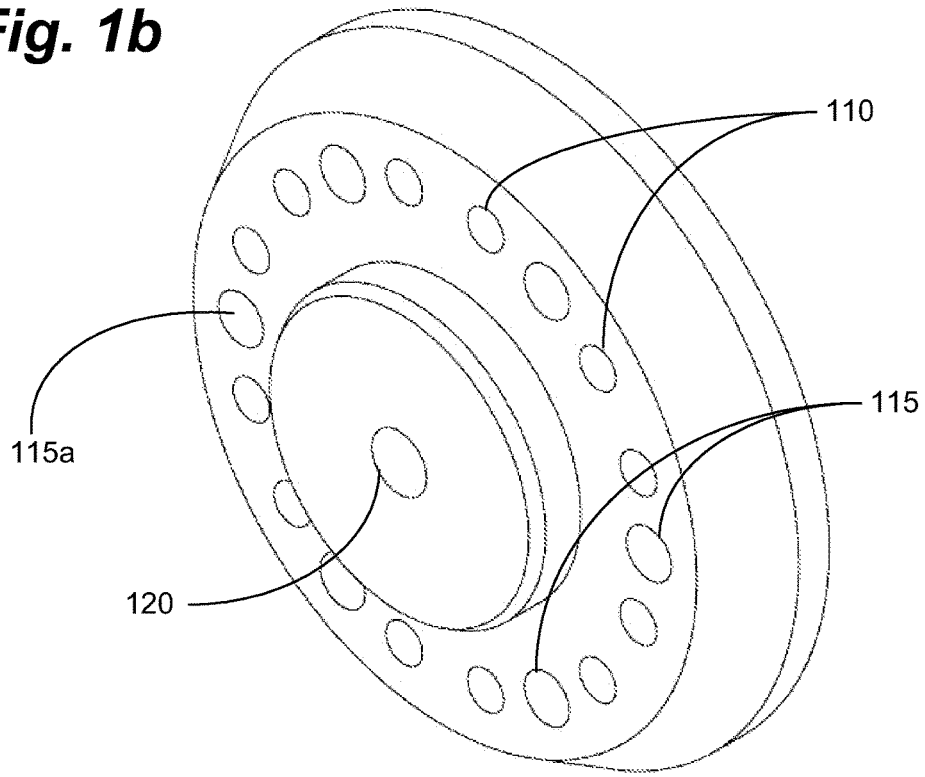
Figure 2A:
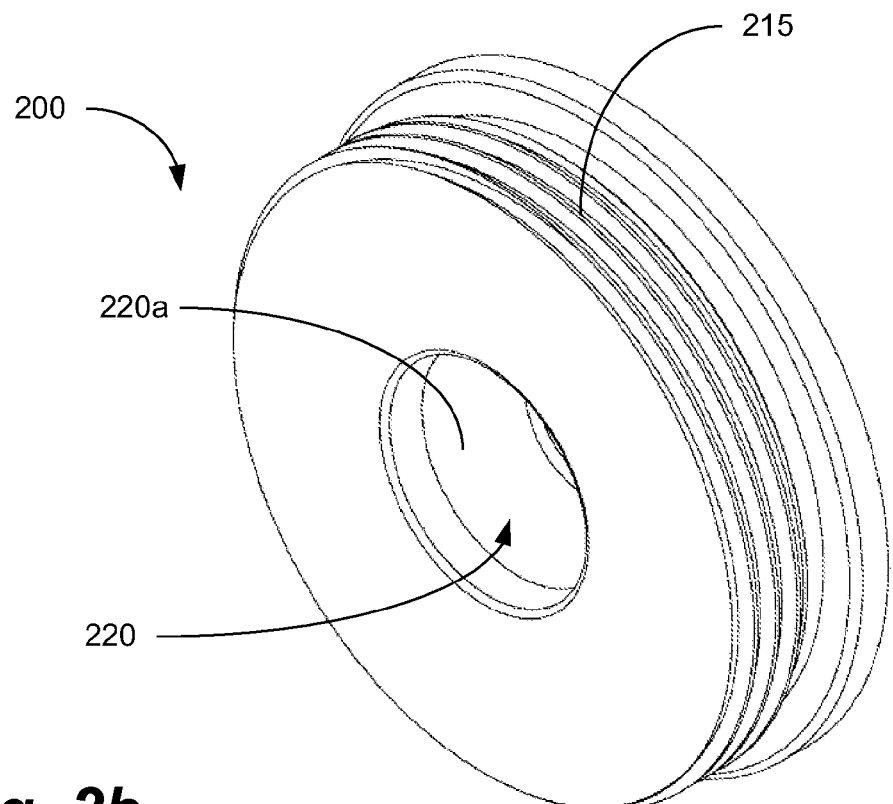
FIGS. 2a and 2b illustrate an isometric view of the front and rear side, respectively, of a cutter adapter, in accordance with some embodiments of the present invention.
Figure 2B:
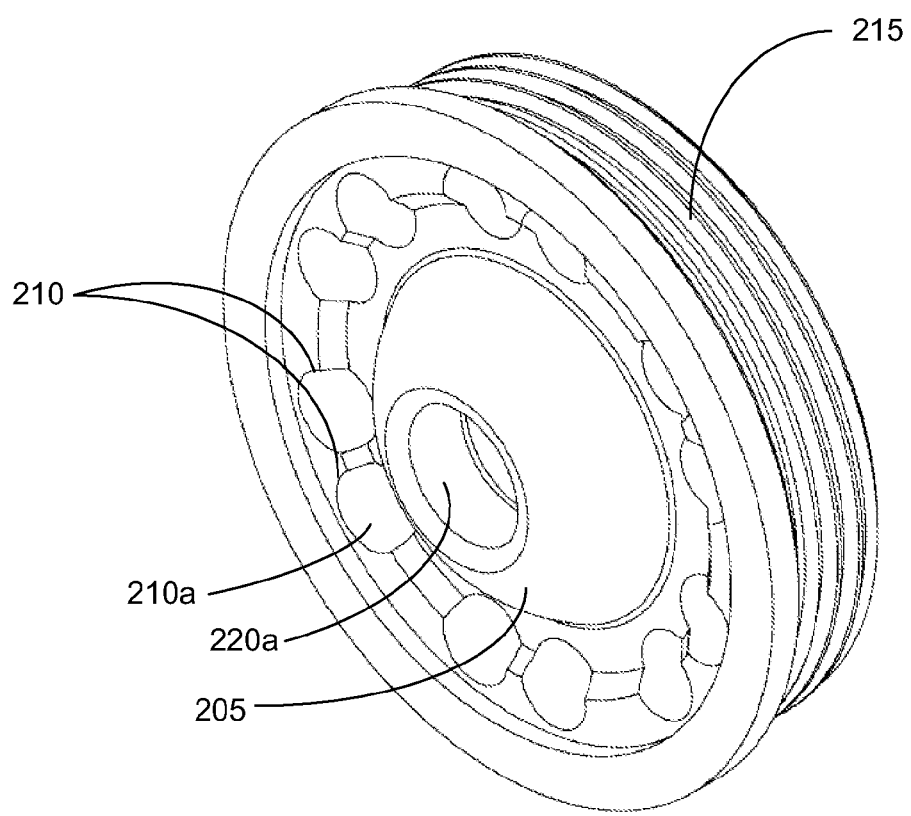

Embodiments of the present invention relate to a system for mounting a cutter head in proper alignment with a die face. The system can utilize a series of complementary spherical surfaces to provide improved alignment of the cutting hub with the die face. In some embodiments, the system can also use a plurality of fasteners with spheroidal or elliptical mating surfaces to provide additional alignment.

To facilitate an understanding of the principles and features of the various embodiments of the invention, various illustrative embodiments are explained below. Although exemplary embodiments of the invention are explained in detail as being systems and methods for aligning a cutter head on a pelletizer, it is to be understood that other embodiments are contemplated, such as embodiments employing other types of machinery requiring alignment. Accordingly, it is not intended that the invention is limited in its scope to the details of construction and arrangement of components set forth in the following description or examples. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

To facilitate an understanding of the principles and features of this disclosure, various illustrative embodiments are explained below. In particular, various embodiments of this disclosure are described as a self-aligning cutter hub. Some embodiments of the invention, however, may be applicable to other contexts, and embodiments employing these embodiments are contemplated. For example and not limitation, some embodiments of the invention may be applicable to various types of machinery needing alignment, such as other types of cutting machinery where a cutter head is disposed proximate a die face. Accordingly, where terms such as "pelletizer" or "pellet" or related terms or components are used throughout this disclosure, it will be understood that other devices, entities, objects, components, or activities can take the place of these in various embodiments of the invention.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example. Any dimensions listed in the various drawings are for illustrative purposes only and are not intended to be limiting. Other dimensions and proportions are contemplated and intended to be included within the scope of the invention.

As discussed above, a problem with conventional alignment methods is that they are generally either heavy and/or expensive or are not sufficiently accurate. To address the shortcomings of conventional systems and methods, therefore, embodiments of the present invention can provide a robust and accurate means of aligning the cutting head with the face of the die. As described below, the system can use a number of spherical or elliptical surfaces to provide a self-aligning cutting head. In this manner, the cutting head can be automatically aligned with the die face upon reassembly of the machine (e.g., after service or repair).

As shown in FIGS. 1a-2b, embodiments of the present invention can comprise a driveshaft adapter 100 and a cutter adapter 200. In some embodiments, the driveshaft adapter 100 can comprise a concave spherical surface 105. The driveshaft adapter 100 can also comprise a plurality of mounting bolt holes 110 and a first plurality of alignment pin holes 115. In some embodiments, the alignment pin holes 115 can comprise elliptical or hemispherical mating surfaces 115a, which will be discussed more fully below. The driveshaft adapter 100 can also comprise a mounting hole 120 for mounting the driveshaft adapter 100 on a driveshaft, and/or connecting the driveshaft adapter 100 to a plug adapter 400, as described below. In some embodiments, the mounting hole 120 can be threaded.

In some embodiments, the cutter adapter 200 can comprise a complementary convex spherical surface 205 that can mate with the concave surface 105 on the driveshaft adapter 100. Of course, this geometry is somewhat arbitrary and the convex/concave surfaces could, for example, be reversed. In some embodiments, the cutter adapter 200 can also comprise a second plurality of alignment holes 210 with hemispherical or elliptical mating surfaces 210a.

In some embodiments, the cutter adapter 200 can also comprise an external threaded surface 215 to enable a blade hub or cutter head or other components to be mounted thereon. In other embodiments, the cutter adapter 200 can comprise a bolting flange or other means for attachment. In some embodiments, the cutter adapter 200 can also comprise a mounting hole 220 with a hemispherical or elliptical mating surface 220a.

Figures 3A, 3B:
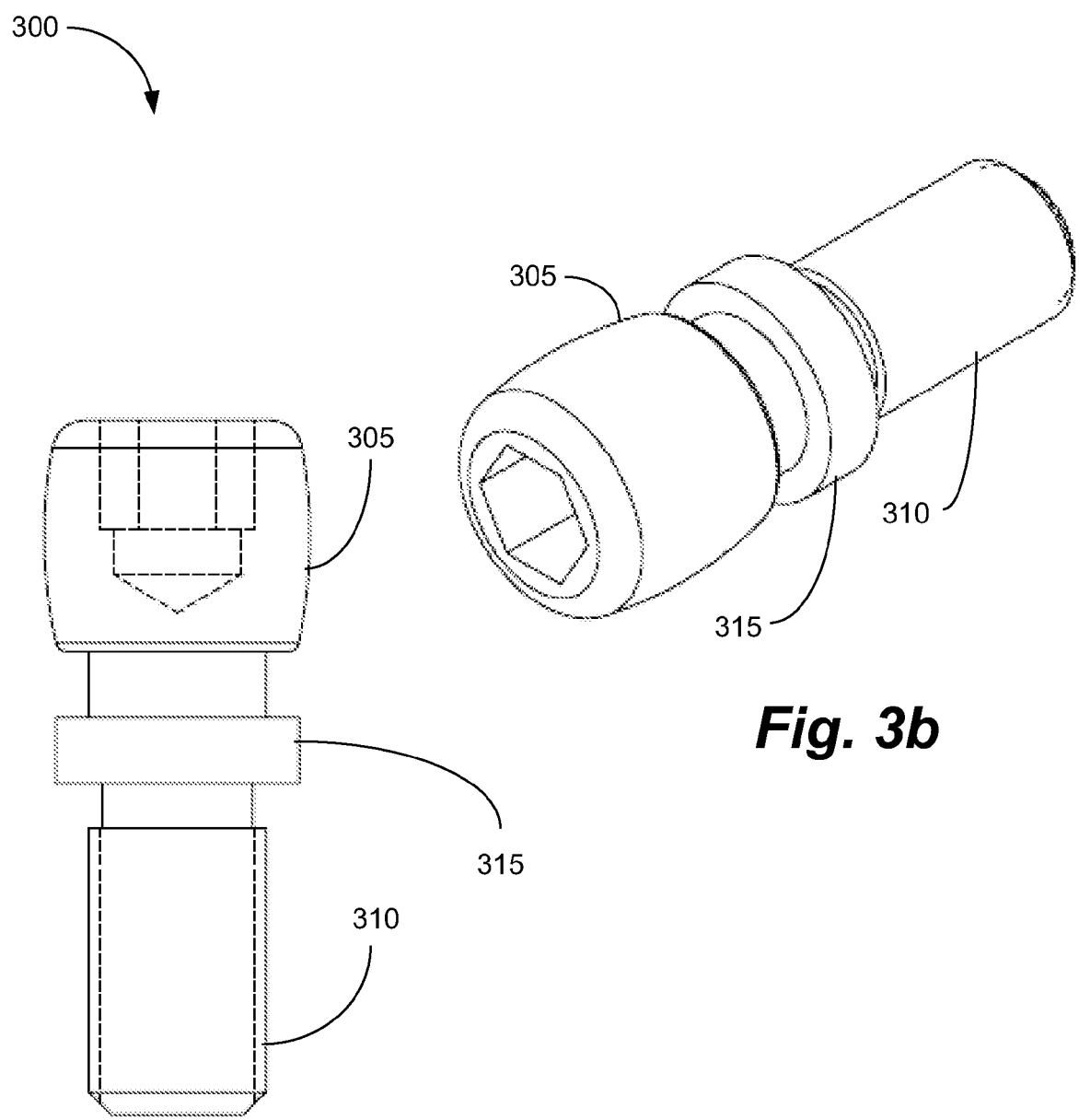
FIGS. 3a and 3b illustrate a schematic view and an isometric view, respectively, of an alignment pin, in accordance with some embodiments of the present invention.

As shown in FIGS. 3a and 3b, the system can also comprise a plurality of alignment pins 300. In some embodiments, the alignment pins 300 can comprise a rounded or elliptical head 305, a threaded portion 310 and a shoulder 315. As shown in FIG. 1a, the alignment pins 300 can be disposed in the alignment pin holes 115 disposed in the shaft adapter 100 and the alignment holes 210 in the cutter adapter 200. In some embodiments, the rounded surface 305 of the alignment pins 300 can be adapted to fit the mating surfaces 115a, 210a of the alignment holes 115, 210.

In some embodiments, the alignment pins 300 can further comprise threads 310 and can be threaded into the alignment pin holes 115. In other embodiments, the alignment pins 300 can be, for example, press-fit, welded, cast, or affixed with adhesive to the shaft adapter 100 and/or the cutter adapter 200. In still other embodiments, the shaft adapter 100 (or cutter adapter 200) and the alignment pins 300 can be cast or forged from a single piece of metal to form a shaft adapter 100 with integral, or unitary, alignment pins 300 (e.g., the shaft adapter 100 and pins 300 can be integrally manufactured as a single piece of cast or forged metal).

In some embodiments, the alignment pins 300 can comprise, for example, tool steel, stainless steel, a heat treated stainless steel, or a combination thereof. In other embodiments, the alignment pins 300 can comprise, for example, ceramic, plastic, titanium, or carbide materials. Of course, the alignment pins 300 can comprise other suitable materials and are not intended to be limited to the aforementioned materials.

In some embodiments, the rounded head 305 of the alignment pins 300 can serve to transmit torque between the shaft adapter 100 and the cutter adapter 200. In this manner the head 305 and or shoulder 315 of the pins 300 can be surface treated to improve lubricity and/or wear resistance. In some embodiments, the surface treatment can comprise a surface hardness treatment including, for example and not limitation, polishing, electro-less plating, electroplating, plasma coating, composite diamond coating, PVD coatings, hard anodizing, or combinations thereof. In other embodiments, the surface treatment can include surface lubricity treatments including, but not limited to, polishing, PTFE coating, graphite, molybdenum disulfide, hexagonal boron nitride, tungsten disulfide, or combinations thereof.

As shown in FIGS. 4a-4c, the cutter adapter 200 can be affixed to the driveshaft adapter 100 using a plug adapter 400. The plug adapter 400 can comprise a spherical or elliptical mating surface 405 configured to mate with the mating surface 220a of the cutter adapter 200. The plug adapter 400 can also extend through the mounting hole 220 of the cutter adapter 200 to interface with the driveshaft adapter, as described below.

Figure 5A:
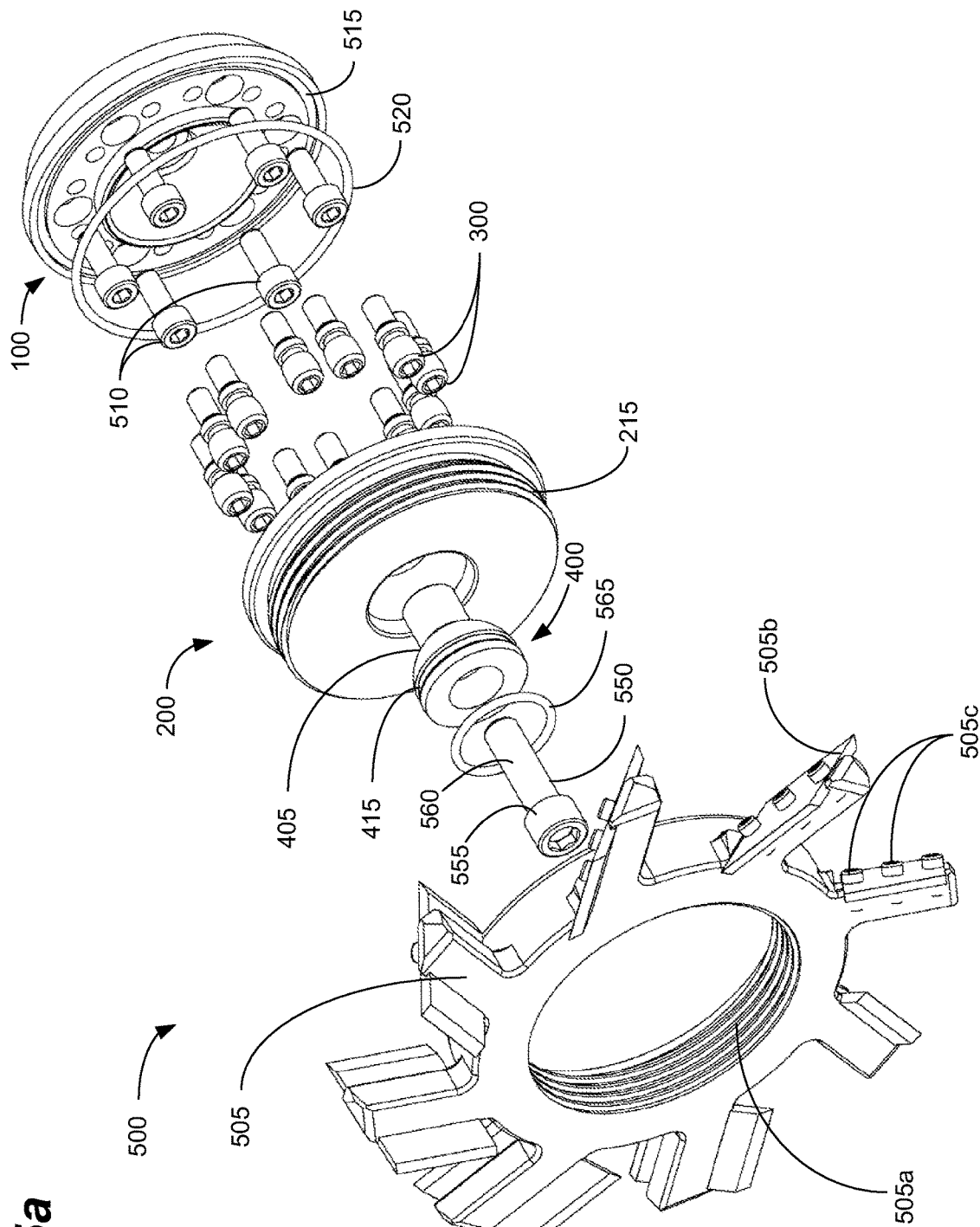
FIG. 5a depicts an isometric exploded view of the self-aligning cutter hub system, in accordance with some embodiments of the present invention.

In some embodiments, as shown in FIGS. 4a-4c, the plug adapter 400 can comprise threads 410 that mate with the driveshaft adapter 100 to couple the plug adapter 400 and the driveshaft adapter 100. In some embodiments, as shown in FIG. 5a, the plug adapter 400 can comprise a bolt 550 for this purpose. The bolt 550 can comprise a Torx®, Allen, or other suitable head 555 to enable the bolt 550 to be installed and tightened in the driveshaft adapter 100. Of course, in some embodiments, the bolt 550 can also comprise a threaded portion 560 to mate with a threaded portion of the driveshaft adapter 100. In other embodiments, the bolt 555 can be press-fit, or otherwise retained, in the driveshaft adapter 100.

In some embodiments, the plug adapter 400 can also comprise an o-ring groove 415 to receive an o-ring 565 (FIG. 5a) to seal greases, oils, and other products in and contaminants out. In some embodiments, the plug adapter can further comprise a collar or spacer 420, sized and shaped to accurately interface with the mounting hole 220 of the cutter adapter 200.

As shown in FIG. 5a, the assembled system 500 can comprise a cutter head 505, the cutter adapter 200, and the shaft adapter 100. In some embodiments, therefore, the shaft adapter 100 can be bolted to a driveshaft, or other power source, using a plurality of fasteners 510. The fasteners 510 can be, for example, bolts, screws, rivets, or pins. In some embodiments, the fasteners 510 can be socket head cap screws countersunk in the face of the shaft adapter 100.

The shaft adapter 100 can further comprise a plurality of alignment pins 300. In some embodiments, the alignment pins 300 can comprise threads 310 and can threadably engage the shaft adapter 100. In other embodiments, the alignment pins 300 can be press-fit, welded, or otherwise affixed to the shaft adapter 100. In still other embodiments, the alignment pins 300 can be, for example, integrally cast or forged with the shaft adapter 100 (i.e., the alignment pins 300 and shaft adapter 100 can be integral). In some embodiments, the shaft adapter 100 and cutter adapter 200 can also comprise an o-ring groove 515 and an o-ring 520. In some embodiments, the o-ring 520 can seal between the shaft adapter 100 and the cutter adapter 200 to prevent oil and grease from escaping from the system 500 and to prevent water and debris from entering the system 500. The o-ring 520 can also provide some flexibility at the interface between the shaft adapter 100 and the cutter adapter 200 enabling the two to pivot slightly.

In some embodiments, the cutter adapter 200 can be affixed to the shaft adapter 100 using the fastener and a plug adapter 400. In some embodiments, an external surface of the cutter adapter 200 can comprise threads 215. In this manner, a cutter head 505 can comprise complementary threads 505a for threadable engagement with the cutter adapter 200. In other embodiments, the cutter head 505 can be bolted, press-fit, brazed, welded, or otherwise affixed to the cutter adapter 200. In still other embodiments, the cutter adapter 200 and cutter head 505 can be, for example, cast or forged as a single component (i.e., the cutter adapter 200 and cutter head 505 can be a unitary piece).

Figure 5B:
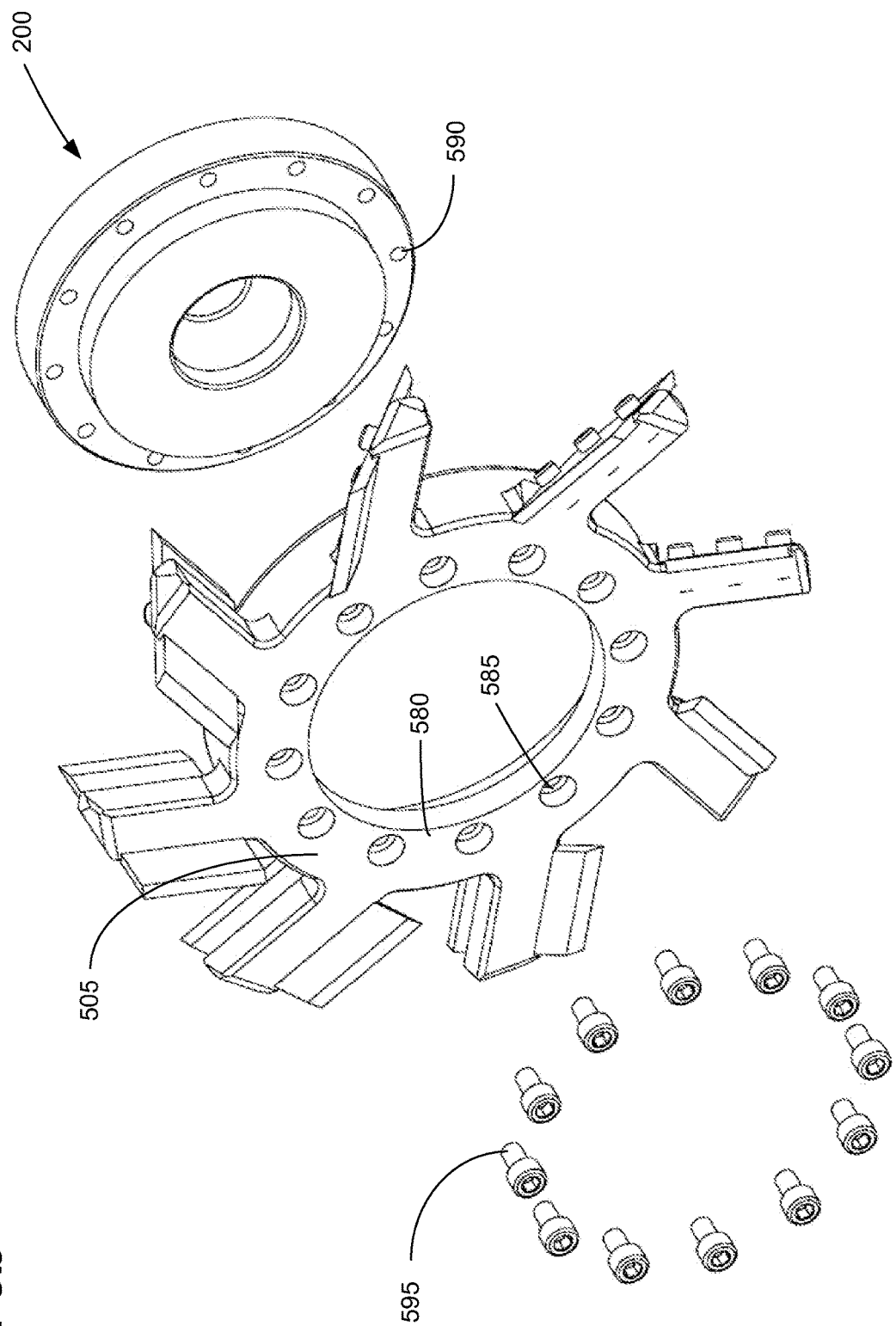
FIG. 5b depicts an isometric exploded view of a cutter head and a cutter hub with bolting flanges, in accordance with some embodiments of the present invention.

In still other embodiments, as shown in FIG. 5b, the cutter head 505 can comprise a mounting flange 580 with mounting holes 585, and the cutter adapter 200 can comprise a plurality of matching mounting holes 590. In this manner, the cutter head 505 can be mounted to the cutter adapter 200 using a fastener 595 such as, for example and not limitation, bolts, rivets, or pins.

In some embodiments, the cutter head 505 can further comprise removable/replaceable cutting blades 505b. This can enable the blades 505b to be removed and replaced and/or sharpened as necessary. In some embodiments, the blades 505b can be attached to the cutter head 505 using one or more fasteners 505c. In other embodiments, the blades 505b can be integral with, adhered to, pinned, wedged, or otherwise affixed to the cutter head 505.

The cutter adapter 200, cutter head 505, and shaft adaptor 100 can be made of, for example and not limitation, tool steel, stainless steel, heat treated stainless steel, or combinations thereof. In other exemplary embodiments, the cutter adapter 200, cutter head 505, and shaft adaptor 100 can be made of ceramic, plastic, titanium, or carbide materials. Of course, the cutter adapter 200, cutter head 505, and shaft adaptor 100 can be made of other materials as well and are by no means limited to the aforementioned materials. In some embodiments, the spherical surfaces 105, 205, 305, and 405 can be surface treated to improve lubricity and/or wear resistance such as polishing, electro-less plating, electroplating, plasma coating, PTFE coating, composite diamond coating, or PVD coatings.

In other embodiments, the aforementioned surface treatments can comprise one, two, and potentially multiple processes including, but not limited to, cleaning, pickling, acid-wash, base-wash, nitriding, carbonitriding, electroplating, electro-less plating, flame spraying including high velocity applications, thermal spraying, plasma spraying, sintering, dip coating, powder coating, vacuum deposition, chemical vapor deposition, physical vapor deposition, sputtering techniques, spray coating, and reactive coatings utilizing thermal, radiational, and/or photoinitiation cure techniques, nitriding, carbonitriding, phosphating, and forming one or more layers thereon. Materials applied utilizing these processes can comprise metals, inorganic oxides, inorganic carbides, inorganic nitrides, inorganic carbonitrides, corrosion inhibitors, sacrificial electrodes, and polymers including urethanes and fluorourethanes, polyolefins and substituted polyolefins, polyesters, polyamides, fluoropolymers, polycarbonatespolyacetals, polysulfides, polysulfones, polyamideimides, polyethers, polyetherketones, silicones, and the like.

Figure 6:
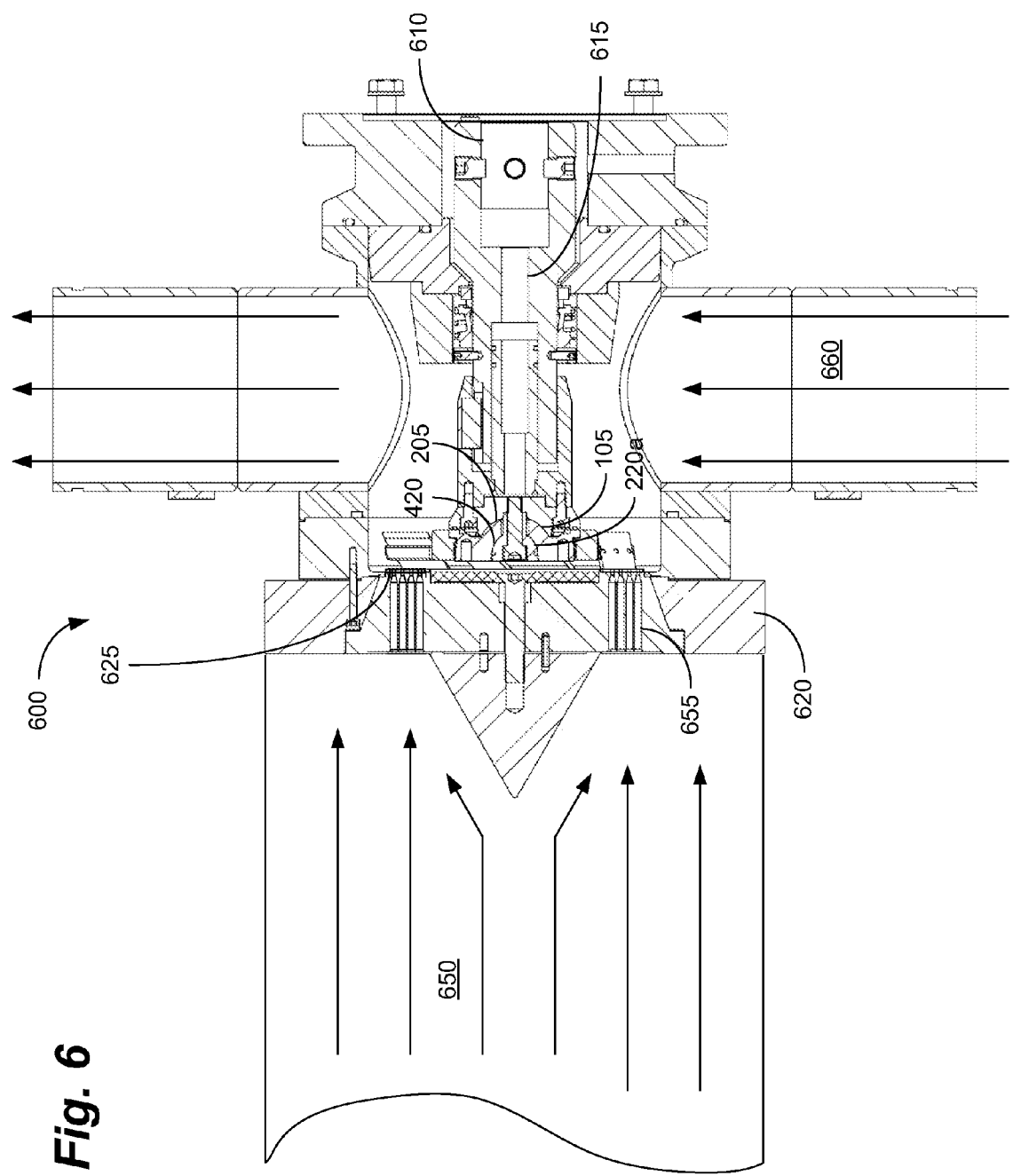
FIG. 6 depicts the system installed in a pelletizer, in accordance with some embodiments of the present invention.

FIG. 6 depicts the system 500 installed in a pelletizer 600. The pelletizer 600 includes a flow of molten plastic 650, or other material, flowing through a die 620 and then extruded through a series of extrusion holes 655 in a die face 625. As the material 650 is extruded, the cutter blades 505b cut the ribbons of extruded plastic 650 off into uniform pellets. The pellets then enter a cooling water flow 660, where they solidify into substantially perfect pellets.

A driveshaft 615 and power source 610 can be attached to the shaft adapter 100 via a plurality of fasteners 510. Power can then be transmitted from the shaft adapter 100 to the cutter adapter 200 via plurality of alignment pins 300 with rounded heads 305. In some embodiments, the cutter adapter 200 can transfer power to the cutter head 505.

The hemispherical, spherical, or elliptical surfaces 105, 205, 305, and 405 used to connect the components of the system 500 combine to provide a system 500 that enables the cutter adapter 200 to pivot through several degrees of motion to enable the cutter blades 505b to automatically be aligned with the die face 625. As mentioned above, this self-aligning feature enables the cutter blades 505b to operate substantially parallel to the die face 625, which reduces wear on the blades 505b and the die face 625. This reduces maintenance and parts costs and also provides more consistent pellet geometry. Of course, the system could also be used on other machines in which alignment of the cutting blades and die face (or other cutting surface) is desirable.

Figure 7A:
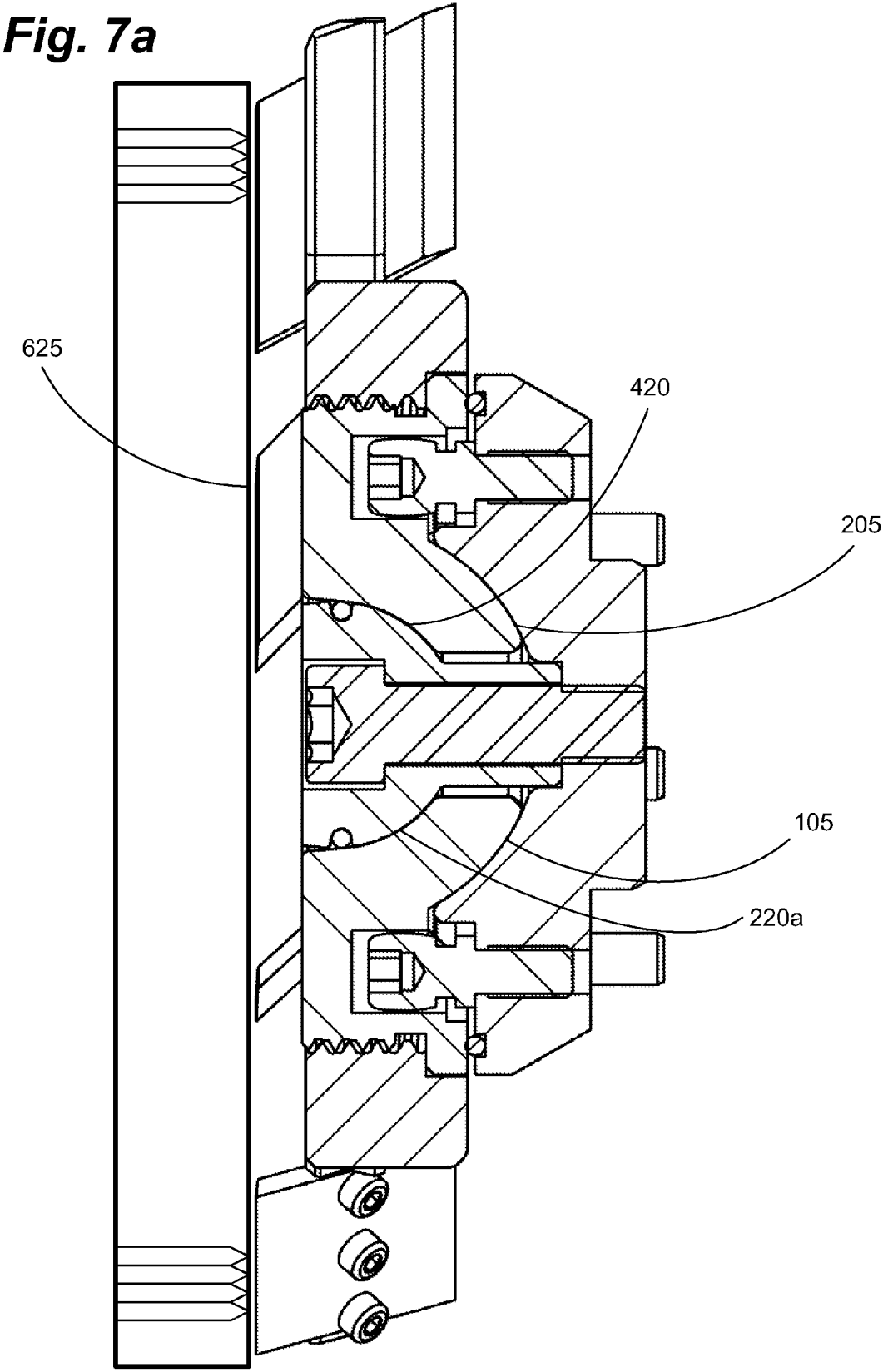
FIG. 7a illustrates a cross-sectional view of a cutter hub assembly in a parallel position, in accordance with some embodiments of the present invention.
Figure 7B:
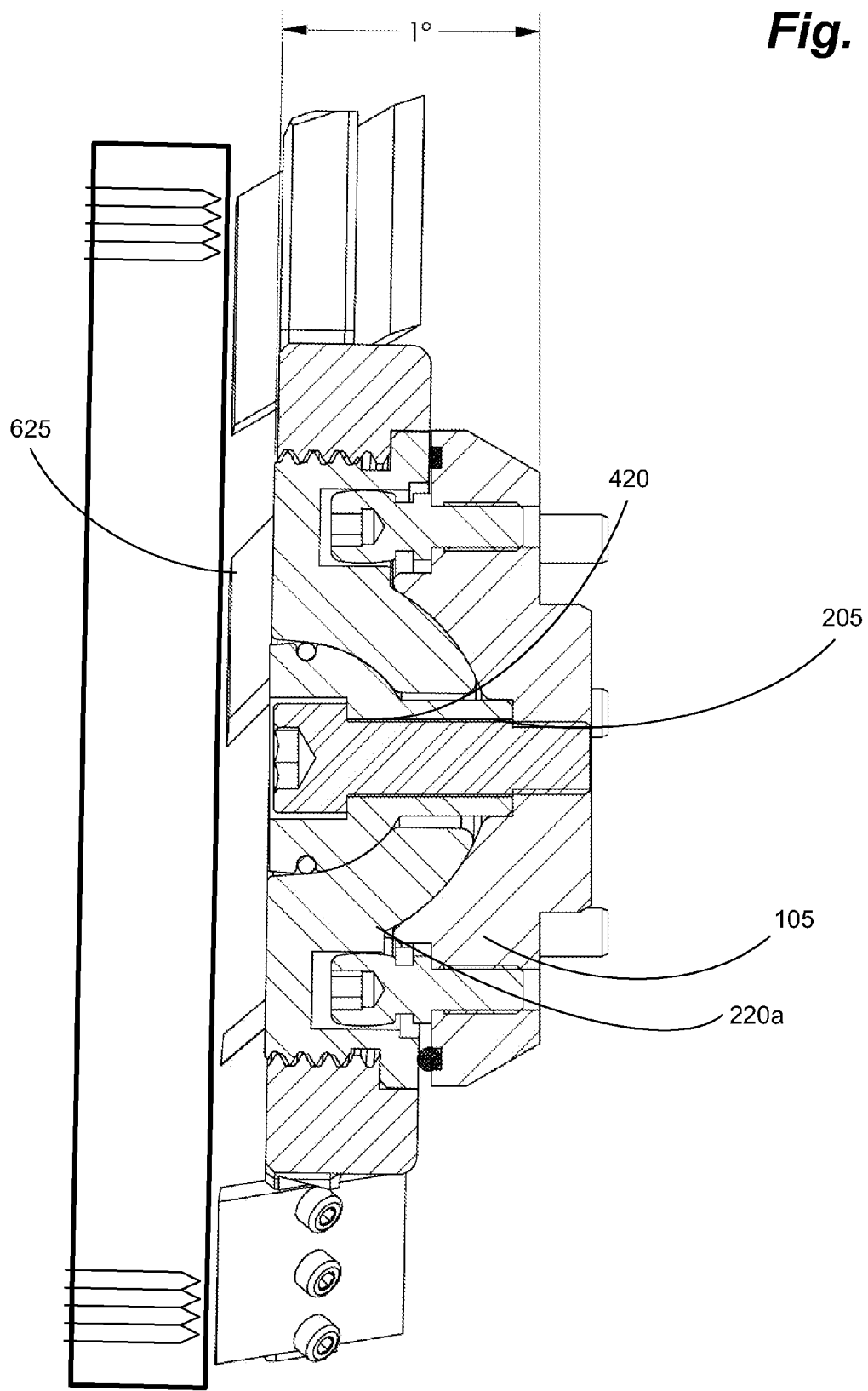
FIG. 7b illustrates a cross-sectional view of a cutter hub assembly in a position in which the system is correcting a 1° misalignment, in accordance with some embodiments of the present invention.

FIG. 7a depicts the system 500 in a parallel position. In other words, if the system 500 is assembled and there is no misalignment between the cutter head 505 and the die face 625, then no adjustment is necessary. As shown in FIG. 7b, however, if the system 500 is assembled and a slight misalignment exists between the cutter head 505 and the die face 625, the system 500 automatically tilts to realign the cutter head 505 and the die face 625. As shown, the cutter head 505 can pivot on the curved surfaces 105, 205, 305, and 405, while the o-ring 520 slightly compresses on one side and slightly expands on the other. This enables the system 500 to pivot as necessary, while still being sealed.

In some embodiments, the system can pivot up to 5 degrees in either direction. In other embodiments, the system can pivot up to 2 degrees in either direction. In still other embodiments, the system can pivot up to 1 degree in either direction. More or less travel can be provided for different situations and represents a compromise between precision and flexibility.

While several possible embodiments are disclosed above, embodiments of the present invention are not so limited. For instance, while several possible configurations of materials for the cutter adapter 200, cutter head 505, and shaft adaptor 100 have been disclosed, other suitable materials and combinations of materials could be selected without departing from the spirit of embodiments of the invention. In addition, the location and configuration used for various features of embodiments of the present invention can be varied according to a particular pelletizer (or other machine), factory, or application that requires a slight variation due to, for example, the materials being manufactured and/or space or power constraints. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A system comprising:
   a die face comprising a plurality of extrusion holes;
   a driveshaft;
   a driveshaft adapter with a first side and a second side and comprising:
     a first plurality of cylindrical alignment holes disposed on the first side of the driveshaft adapter; and
     a concave spherical surface disposed on the first side of the driveshaft adapter, the first and second sides of the driveshaft adapter being oriented parallel to the die face;
   a cutter adapter with a first side and a second side and comprising:
     a second plurality of cylindrical alignment holes disposed on the second side of the cutter adapter; and
     a complementary convex spherical surface disposed on the second side of the cutter adapter for mating engagement with the concave spherical surface of the driveshaft adapter, the first and second sides of the cutter adapter being oriented parallel to the die face;
   a cutter head attached to the cutter adapter and comprising a plurality of cutting blades;
   a plug adapter comprising a convex surface sized and shaped to be in slideable engagement with a concave surface on the first side of the cutter adapter, the plug adapter further configured to be in engagement with the driveshaft adapter; and a plurality of alignment pins each with a first end and a second end, each first end comprising a rounded or elliptical surface sized and shaped to be in slideable engagement with one of a first and second plurality of cylindrical alignment holes and each second end being fixed in the other of the first and second plurality of cylindrical alignment holes;

wherein the convex spherical surface of the cutter adapter is configured to engage with and pivot about the concave spherical surface of the driveshaft adapter as the rounded or elliptical surfaces on the plurality of alignment pins slide within the alignment holes to align the cutter adapter with the die face.

2. The system of claim 1, wherein one or more of the concave surface of the driveshaft adapter, the convex surface of the cutter adapter, the concave surface of the cutter adapter, and the convex surface of the plug adapter are surface treated by one or more of polishing, electro-less plating, electroplating, plasma coating, PTFE coating, composite diamond coating, or PVD coating.

3. The system of claim 1, the plug adapter further comprising a first seal groove disposed on the convex surface; and
  an adapter seal sealing the convex surface of the plug adapter and the concave surface on the first side of the cutter adapter.

4. The system of claim 3, wherein the adapter seal is an o-ring.

5. The system of claim 1, wherein the cutter adapter further comprises a first threaded surface disposed on an external, perimeter of the cutter adapter; and
  the cutter head is toroidal and the plurality of cutting blades are disposed on an external, perimeter surface of the cutter head, the cutter head further comprising a second threaded surface disposed on an internal, perimeter surface threadably engageable with the first threaded surface disposed on the external, perimeter of the cutter adapter.

6. The system of claim 5, wherein each of the plurality of cutting blades further comprise one or more mounting fasteners detachably coupling the plurality of cutting blades to the toroidal cutter head.

7. The system of claim 1, further comprising:
  a first groove disposed on the first side of the driveshaft adapter;
  a second groove disposed on the second side of the cutter adapter; and
  a first seal for sealing the first surface of the driveshaft adapter to the second surface of the cutter adapter.

8. The system of claim 1, wherein the second end of each of the plurality of alignment pins comprises threads for threadable engagement within the other of the first and second plurality of cylindrical alignment holes in one of the driveshaft adapter and the cutter adapter.

9. The system of claim 1, wherein the cutter head is attached to the cutter adapter such that a force applied to the cutter head causes the cutter adapter to pivot.

10. The system of claim 1, wherein the rounded or elliptical surface on the plurality of alignment pins comprises one or more of a surface hardness treatment and a surface lubricity treatment.

11. A system comprising:
  a die face comprising a plurality of extrusion holes;
  a power source;
  a driveshaft, with a first end and a second end, the first end detachably coupled to the power source;
  a driveshaft adapter with a first side and a second side, the first side detachably coupled to the second end of the driveshaft and the second side being aligned parallel to the die face, the driveshaft adapter comprising:
    a first plurality of cylindrical alignment holes disposed on the second side of the driveshaft adapter and aligned perpendicular to the die face; and
    a concave spherical surface disposed on the second side of the driveshaft adapter;
  a cutter adapter with a first side and a second side and comprising:
    a second plurality of cylindrical alignment holes disposed on the first side and aligned perpendicular to the die face; and
    a convex spherical surface disposed on the first side of the cutter adapter;
  a cutter head attached to the cutter adapter and comprising a plurality of cutting blades;
  a plug adapter comprising a convex surface sized and shaped to be in slideable engagement with a concave surface on the second side of the cutter adapter, the plug adapter further configured to be in engagement with the driveshaft adapter; and
  a plurality of alignment pins each with a first end and a second end, each first end comprising a rounded or elliptical surface in slideable engagement with one of the first and second plurality of alignment holes, and each second end being fixed in the other of the first and second plurality of alignment holes;
  wherein the convex spherical surface of the cutter adapter is configured to engage with and pivot on the concave spherical surface of the driveshaft adapter as the rounded or elliptical surfaces on the plurality of alignment pins slide within the alignment holes; and
  wherein the cutter adapter is configured to pivot to align the cutting blades with the die face in parallel arrangement.

12. The system of claim 11, wherein the cutter adapter is configured to pivot in response to a force caused by contact between the cutting blades and the die face.

13. The system of claim 11, wherein the cutter adapter further comprises a first threaded surface disposed on an external, perimeter of the cutter adapter; and
  the cutter head is toroidal and the plurality of cutting blades are disposed on an external, perimeter surface of the cutter head, the cutter head further comprising a second threaded surface disposed on an internal, perimeter surface threadably engageable with the first threaded surface disposed on the external, perimeter of the cutter adapter.

14. The system of claim 11, wherein the driveshaft adapter and the plurality of alignment pins are integrally manufactured.

15. The system of claim 11, wherein the rounded or elliptical surface on the plurality of alignment pins comprises a surface hardness treatment.

16. The system of claim 11, wherein the rounded or elliptical surface on the plurality of alignment pins comprises a surface lubricity treatment.

17. The system of claim 11, wherein one or more of the concave surface of the driveshaft adapter and the convex surface of the cutter adapter are surface treated by one or more of polishing, electro-less plating, electroplating, plasma coating, PTFE coating, composite diamond coating, or PVD coating.

18. A system for aligning cutting blades with a die surface, the system comprising:
- a driveshaft adapter connected to a driveshaft said driveshaft adapter having a first side and a second side arranged in parallel to the die surface, and a concave spherical surface disposed on the first side;
- a cutter adapter having a first side arranged in parallel to the die surface with a convex spherical surface disposed on the first side, and a second side arranged in parallel to the die surface with a concave spherical surface disposed on the second side;
- a plug adapter having a first side and a convex surface disposed on the first side of the plug adapter and sized and shaped to be in slideable engagement with the concave surface on the second side of the cutter adapter, the plug adapter further configured to be in engagement with the driveshaft adapter; and
- a cutter head attached to the cutter adapter and comprising cutting blades;
- wherein the convex and concave spherical surfaces of the cutter adapter are configured to engage with and pivot between the concave surface of the driveshaft adapter and the convex surface of the plug adapter, respectively, in response to a force applied to the cutting blades; and
- wherein the cutter adapter is configured to pivot to align the cutting blades with the die face in parallel arrangement.

19. The system of claim 18, further comprising a plurality of alignment pins to transfer torque from the driveshaft adapter to the cutter adapter, wherein the alignment pins do not prevent the cutter adapter from pivoting.

20. The system of claim 19, wherein the alignment pins comprise a rounded or elliptical surface with one or more of a surface hardness treatment and a surface lubricity treatment.

21. The system of claim 18, wherein one or more of the concave surface of the driveshaft adapter and the convex surface of the plug adapter are surface treated by one or more of polishing, electro-less plating, electroplating, plasma coating, PTFE coating, composite diamond coating, or PVD coating.

* * * * *